(12) United States Patent
Takashima et al.

(10) Patent No.: US 8,136,623 B2
(45) Date of Patent: Mar. 20, 2012

(54) ELECTRIC MOTOR APPARATUS FOR ELECTRIC POWER STEERING AND ELECTRIC POWER STEERING APPARATUS

(75) Inventors: Kazuhisa Takashima, Tokyo (JP); Yoshihito Asao, Tokyo (JP); Satoru Akutsu, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 496 days.

(21) Appl. No.: 12/339,669

(22) Filed: Dec. 19, 2008

(65) Prior Publication Data

US 2009/0250287 A1 Oct. 8, 2009

(30) Foreign Application Priority Data

Apr. 7, 2008 (JP) .................................. 2008-099335

(51) Int. Cl.
*B62D 5/04* (2006.01)
(52) U.S. Cl. .......... 180/444; 180/446; 310/71; 310/68 B
(58) Field of Classification Search .................. 180/444, 180/446; 310/71, 68 B
See application file for complete search history.

(56) References Cited

U.S. PATENT DOCUMENTS

| | | | |
|---|---|---|---|
| 6,577,030 B2 | 6/2003 | Tominaga et al. | |
| 6,707,185 B2 | 3/2004 | Akutsu et al. | |
| 6,903,473 B2 * | 6/2005 | Matsuyama et al. | 310/71 |
| 6,972,501 B2 * | 12/2005 | Morikawa et al. | 310/71 |
| 7,021,418 B2 * | 4/2006 | Tominaga et al. | 180/444 |
| 7,635,046 B2 * | 12/2009 | Tominaga et al. | 180/444 |
| 7,675,206 B2 * | 3/2010 | Akutsu et al. | 310/71 |
| 7,687,945 B2 * | 3/2010 | Matin et al. | 310/64 |
| 7,743,875 B2 * | 6/2010 | Hidaka et al. | 180/446 |
| 7,830,053 B2 * | 11/2010 | Lee | 310/89 |
| 7,872,386 B2 * | 1/2011 | Lee | 310/89 |
| 2009/0267430 A1 | 10/2009 | Imamura et al. | |

FOREIGN PATENT DOCUMENTS

| | | | |
|---|---|---|---|
| JP | 2002-120739 A | | 4/2002 |
| JP | 2004-135492 | * | 4/2004 |
| JP | 2004-135492 A | | 4/2004 |
| JP | 2005-117736 A | | 4/2005 |
| WO | 2007-026894 A1 | | 3/2007 |

OTHER PUBLICATIONS

Japanese Office Action issued in Application No. 2008-099335, date May 11, 2010.

* cited by examiner

*Primary Examiner* — Paul N Dickson
*Assistant Examiner* — Marlon Arce
(74) *Attorney, Agent, or Firm* — Sughrue Mion, PLLC (57) ABSTRACT

An electric motor and a control unit are integrally formed and are placed coaxially with a shaft of a gear box for reducing a speed of rotation of the electric motor and also the control unit is placed between the gear box and the electric motor, and a power feeding part of the electric motor is bonded to a bonding part of the control unit inside a housing or a case through an opening part disposed in the housing and/or the case 24.

17 Claims, 9 Drawing Sheets

FIG. 10

ELECTRIC MOTOR APPARATUS FOR ELECTRIC POWER STEERING AND ELECTRIC POWER STEERING APPARATUS

CROSS REFERENCE TO RELATED APPLICATION

The present application claims priority from Japanese Patent Application No. 2008-099335, which was filed on Apr. 7, 2008, the disclosure of which is herein incorporated by reference in its entirety.

TECHNICAL FIELD

This invention relates to an electric motor apparatus for electric power steering for assisting steering force of a steering wheel of a vehicle, and an electric power steering apparatus.

BACKGROUND

As a conventional electric motor apparatus for electric power steering, means in which a control unit comprising a metal substrate for installing a heat generation component, a control substrate for installing a non-heat generation component, a circuit case in which insert molding of a conductive plate for wiring and a connector is performed, and a heat sink for dissipating heat of the metal substrate etc. is placed between an electric motor and a speed reduction mechanism and a terminal of the control unit and a winding terminal extending to the control unit side beyond the electric motor are welded in connection of a power supply part of the control unit and the electric motor has been known.

Also, means in which a case for attaching a driving circuit and a control circuit is placed between an electric motor and a worm side case and in connection of a power supply part of a circuit substrate and the electric motor, an ECU lead and a brush lead extending from the electric motor to the case side are soldered and the connection is locked by a conductive fixed spring has been known.

In both the structures, a shaft extending from the electric motor to the speed reduction mechanism through the control unit is attached and it is coupled to the speed reduction mechanism through the shaft.

In a general electric motor apparatus for electric power steering including the configuration described above, the best assist with respect to steering of a steering wheel of a driver is performed by driving the electric motor based on signals of a vehicle speed sensor for detecting a travel speed of a vehicle and a torque sensor for detecting steering torque of the steering wheel.

In these electric motor apparatuses for electric power steering, by integrating the electric motor with the control unit, the whole apparatus is miniaturized and also a length of electrical wiring for making electrical connection between the electric motor and the control unit can be minimized and noise, power loss, cost cutting, etc. by a decrease etc. in material cost can be reduced.

[Patent Reference 1] JP-A-2002-120739
[Patent Reference 2] JP-A-2004-135492

SUMMARY

In the conventional electric motor apparatus for electric power steering, connection of a power supply part of a control unit and an electric motor is made by welding or soldering, so that in the event that trouble occurs in either the electric motor or the control unit, both of the electric motor and the control unit must be replaced though the other is normal.

Also, the welded part or soldering can be separated to a certain extent, but there were problems that it takes time and effort to separate and workability is bad and also in the case of separation, it becomes difficult to again connect a normal connection part of the power supply part due to deformation etc. and both of the electric motor and the control unit must be replaced after all.

A problem of the invention is to solve such problems, and an object of the invention is to provide an electric motor apparatus for electric power steering and an electric power steering apparatus in which when trouble occurs in either an electric motor or a control unit and the other is normal, a structure capable of separation for replacing only the trouble occurring part is obtained and workability of separation is greatly improved.

An electric motor apparatus for electric power steering according to the invention is an electric motor apparatus for electric power steering in which an electric motor comprising a rotor in which a shaft is rotatably supported, a stator disposed outside the rotor, a power feeding part which is connected to the stator or the rotor and supplies electric power, and a housing for supporting the rotor and the stator is formed integrally with a control unit comprising a driving circuit for supplying electric power to the electric motor, a bonding part bonded to the power feeding part of the electric motor, a control circuit for controlling the driving circuit, and a case for covering the driving circuit and the control circuit, and the control unit and the electric motor are attached to a gear box for reducing a speed of rotation of the electric motor and are placed coaxially with a shaft of the gear box and also the control unit is placed between the gear box and the electric motor, and the power feeding part of the electric motor is bonded to the bonding part of the control unit inside the housing or the case through an opening part disposed in the housing and/or the case.

An electric power steering apparatus according to the invention is constructed so that the electric motor apparatus for electric power steering described above is mounted in an attachment part of a gear box for reducing a speed of rotation of this motor apparatus and also the motor apparatus is placed substantially coaxially with a shaft of the gear box.

According to an electric motor apparatus for electric power steering according to the invention, separation between an electric motor and a control unit of the electric motor apparatus for electric power steering in which the electric motor and the control unit are integrally formed and are placed coaxially with a shaft of a gear box can be made and workability of the separation can also be greatly improved.

According to an electric power steering apparatus according to the invention, it is constructed so that the electric motor apparatus for electric power steering described above is mounted in an attachment part of a gear box for reducing a speed of rotation of the motor apparatus and also the motor apparatus is placed substantially coaxially with a shaft of the gear box, so that separation between an electric motor and a control unit can be made and workability of the separation can also be greatly improved and further, the whole apparatus can be constructed compactly at low cost.

BRIEF DESCRIPTION OF THE DRAWINGS

Illustrative aspects of the invention will be described in detail with reference to the following figures wherein.

DETAILED DESCRIPTION OF EXEMPLARY EMBODIMENTS OF THE PRESENT INVENTION

First Embodiment

A first embodiment will be described based on FIGS. 1 to 4. In addition, in each of the following drawings, description is made by assigning the same numerals to the same parts or corresponding parts.

Figure 1:
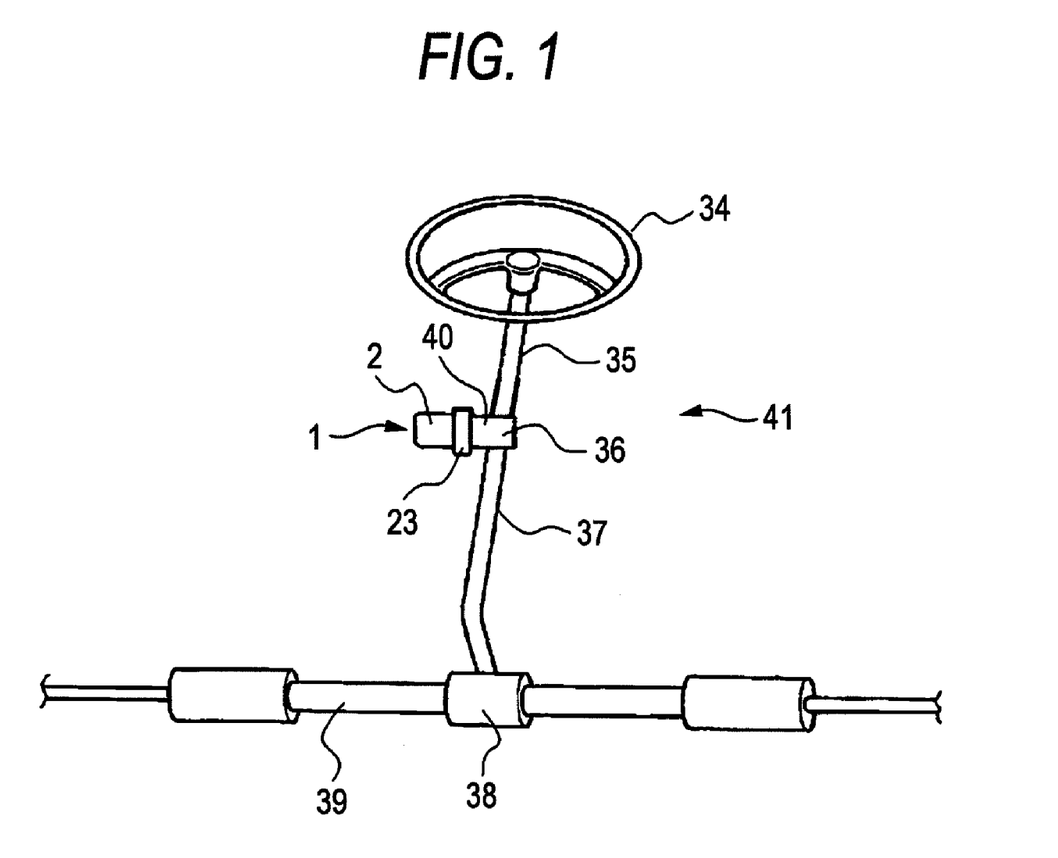
FIG. 1 is an explanatory diagram showing an electric power steering apparatus into which an electric motor apparatus for column type electric power steering of a first embodiment of the invention is incorporated.
Figure 2:
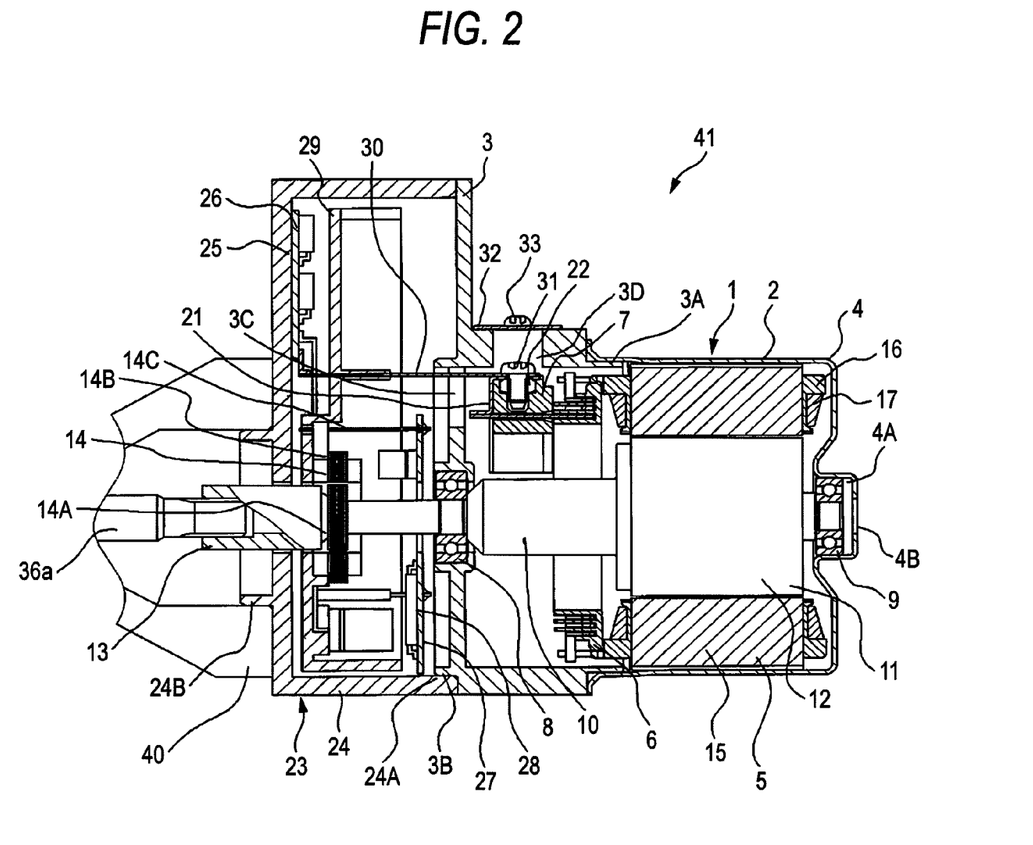
FIG. 2 is a sectional view of the electric motor apparatus for electric power steering of FIG. 1.
Figure 3:
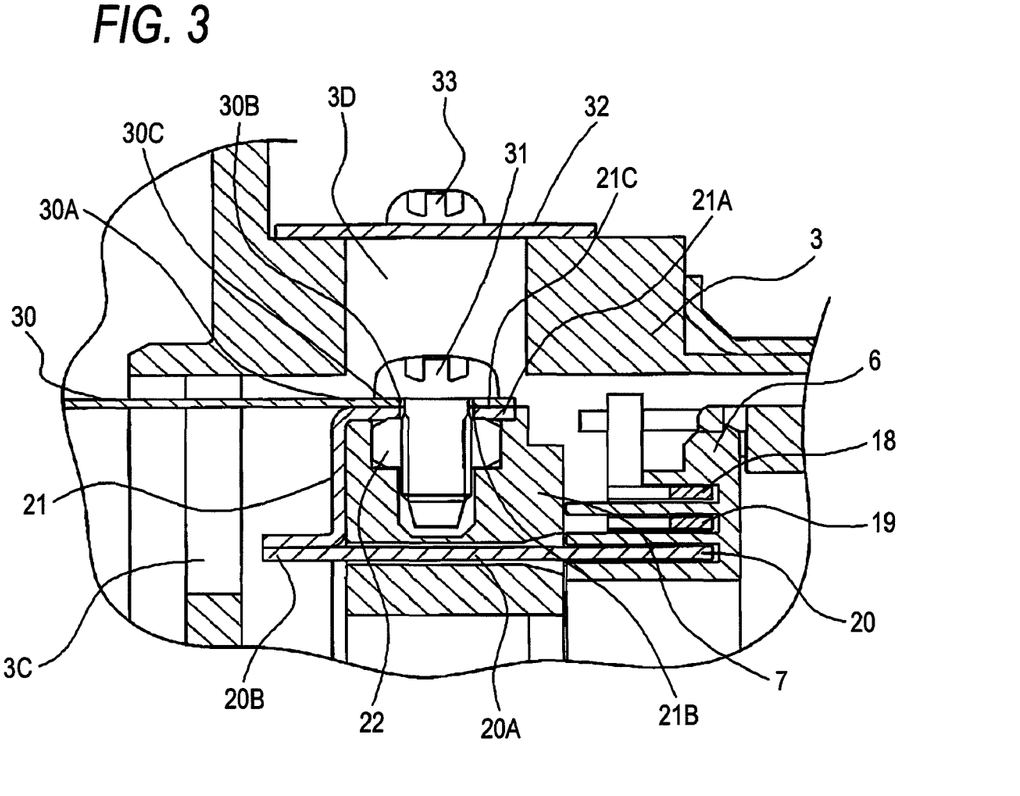
FIG. 3 is an enlarged view of a bonding region of a bonding part of a control unit and a power feeding part of an electric motor of FIG. 2.
Figure 4:
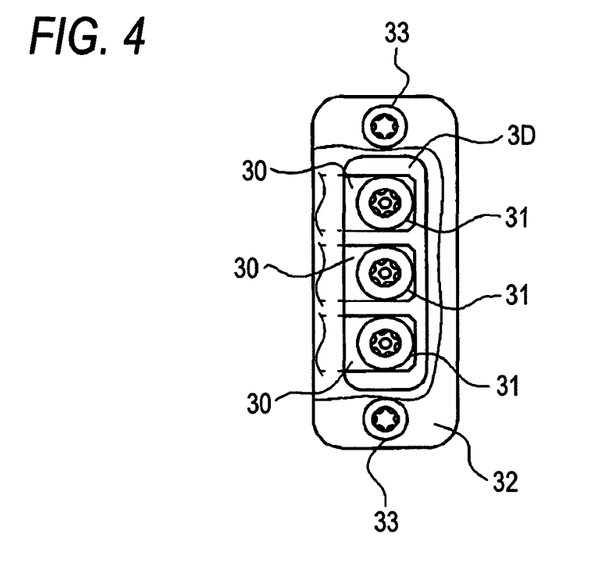
FIG. 4 is an explanatory diagram of a side surface of FIG. 3 when the bonding region of FIG. 3 is viewed from the side of a screw 33.

FIG. 1 is an explanatory diagram showing an electric power steering apparatus into which an electric motor apparatus for column type electric power steering is incorporated, and FIG. 2 is a sectional view of the electric motor apparatus for electric power steering of FIG. 1, and FIG. 3 is an enlarged view of a bonding region of a bonding part of a control unit and a power feeding part of an electric motor of FIG. 2, and FIG. 4 is an explanatory diagram of a side surface of FIG. 3 when the bonding region of FIG. 3 is viewed from the side of a screw 33.

In an electric power steering apparatus 41, steering force from a steering wheel 34 of a vehicle is transmitted through a column shaft 35.

An electric motor apparatus 1 for electric power steering is attached to the column shaft 35 through a gear box 36 in which a speed reduction mechanism (not shown) is accommodated. In an output (torque, rotational speed) of a shaft 10 of a rotor 12 of an electric motor 2 of the electric motor apparatus 1 for electric power steering, a direction of rotation is changed at a right angle by the speed reduction mechanism and the output is reduced and is transmitted to a steering wheel joint 37.

A pinion gear accommodated in a pinion gear box 38 is disposed in the end of the steering wheel joint 37. This pinion gear transmits rotational motion to a rack 39 as linear motion and the rack 39 obtains necessary displacement. A wheel interlocks with the linear motion of this rack 39 and a change etc. in direction of the vehicle can be made.

This electric motor apparatus 1 for electric power steering comprises the electric motor 2 for outputting assist torque to the steering wheel 34, a control unit 23 for controlling driving force of the rotor 12 of this electric motor 2, a bonding region in which the control unit 23 is electrically bonded to the electric motor 2, a power connector for electrically connecting the control unit 23 to a battery, various signal connectors for electrically connecting the control unit 23 to a torque sensor, etc. (the battery, the torque sensor and each of the connectors are not shown.)

The electric motor 2 comprises a housing 3 made of an aluminum material, a frame 4 made of an iron material with a bottomed cylindrical shape fitted into a frame side fitting part 3A of the housing 3, a stator 5 fixed to an inner wall surface of this frame 4, a doughnut-shaped holder 6 made of a resin material fixed to a side surface of the side of the housing 3 of this stator 5, a base 7 made of a resin material supported in the side surface of the side of the housing 3 of this holder 6, a shaft 10 rotatably supported by a front bearing 8 and a rear bearing 9 placed on a center axis line of the stator 5 and the housing 3, a rotor 12 in which a permanent magnet 11 is glued to this shaft 10, a resolver rotor 14A which is fixed to the shaft 10 and is a rotational position sensor for detecting a rotational angle of the rotor 12, and a boss 13 which is pressed into the end of the shaft 10 and is coupled to a shaft 36a of the gear box 36.

The housing 3 and the frame 4 are integrally fixed by a screw axially from the side of the rear bearing 9.

The stator 5 comprises a stator iron core 15 in which slots (not shown) extending in an axis line direction are formed with the slots circumferentially spaced, and a stator winding 17 constructed by winding a copper wire on the slots of this stator iron core 15 through a bobbin 16.

A U-phase coil part, a V-phase coil part and a W-phase part of this stator winding 17 are formed in delta connection.

In addition, in the case of star connection, connection parts are constructed by connecting common sides of respective coil parts to a common terminal by fusing etc.

The holder 6 has a U-phase terminal 18, a V-phase terminal 19 and a W-phase terminal 20 which are formed in a body of the holder 6 and respectively extend in a circumferential direction and pack into groove parts with different diameter dimensions.

The U-phase terminal 18, the V-phase terminal 19 and the W-phase terminal 20 are formed in a circular shape or a shape near to a circular arc so as to pack into each of the groove parts. These terminals are connected to the U-phase coil part, the V-phase coil part and the W-phase part of the stator winding 17.

Also, the U-phase terminal 18, the V-phase terminal 19 and the W-phase terminal 20 have connection parts 20A respectively extending in an axis line direction (only a W phase is typically illustrated in the embodiment).

The base 7 is constructed by incorporating a terminal 21 for power feeding bonded by a screw 31 and a bus bar 30 for bonding of the control unit 23 and a nut 22 into which the screw 31 is screwed, and a hole 21B larger than a screw diameter is disposed in the terminal 21 for power feeding.

Also, regions for guiding the connection parts 20A extending in the axis line direction from the U-phase terminal 18, the V-phase terminal 19 and the W-phase terminal 20 are disposed in the base 7, and top parts 20B of the connection parts 20A are connected to the terminal 21 for power feeding by welding.

In addition, a bonded surface 21C of the terminal 21 for power feeding faces in a direction substantially parallel to the shaft 10 and in that part, electrical bonding between a power feeding part 21A of the electric motor 2 and a bonding part 30A of the control unit 23 is performed.

In addition, in the embodiment, the holder 6 and the base 7 are formed as different components, but may be formed as an integrated component.

An outer ring part of the front bearing 8 is fixed to the housing 3. Also, a frame side fitting part 3A fitted into the frame 4 and a case side fitting part 3B fitted into a case 24 of the control unit 23 are formed in both end face sides of its axis direction. A hole 3C through which the bus bar 30 for bonding extending from the control unit 23 toward the side of the electric motor 2 passes is disposed in the case side fitting part 3B.

Also, an opening part 3D is bored in a region opposed to the base 7 in a diameter direction, and this opening part 3D is disposed in a direction substantially vertical to the shaft 10. A screw hole for fixing a cover 32 by a screw is disposed in an outside surface of the opening part 3D. In the cover 32, a hole for attachment by a screw 33 is disposed so as to cover the opening part 3D of the housing 3.

The stator 5 is pressed into the frame 4 with a bottomed cylindrical shape and a bearing box 4A for accommodating and holding the rear bearing 9 is formed in a bottom surface part of the frame 4.

A hole 4B used in the case of assembling the housing 3 or the rotor 12 into the frame 4 is bored in the bottom surface part of the frame 4. This hole 4B is finally closed from the outside using a rubber cap etc.

A resolver 14 is constructed of the resolver rotor 14A pressed into the shaft 10 and a resolver stator 14B arranged in the outside of this resolver rotor 14A, and in the resolver stator 14B, an armored resin part molded by a resin is fixed to a lead frame 29 integrally molded by a resin material of the control unit 23 by thermal caulking.

A terminal 14C for signal connection is connected to a control substrate 27 of the control unit 23 by soldering.

A housing side fitting part 24A fitted into the housing 3 and a gear box side fitting part 24B fitted into the gear box 36 are formed in both end faces of an axial direction of the case 24 made of an aluminum material of the control unit 23.

In an internal end face of the side of the electric motor 2 of the case 24, a power element etc. are mounted in a metal substrate 25 and a driving circuit 26 for supplying electric power to the electric motor 2 is arranged in close contact and a microcomputer etc. are mounted in the control substrate 27 and a control circuit 28 for controlling the driving circuit 26, the lead frame 29 for connecting or holding both the circuits and installing or connecting components other than a substrate mounted component and the resolver stator 14B fixed to the inner circumference of the lead frame 29 are arranged to construct the control unit 23.

The bonding part 30A which is electrically bonded to the power element and supplies electric power to the electric motor 2 is disposed in the lead frame 29, and its bonding part comprises the bus bar 30 for bonding for supplying electric power to U, V and W phases. This bus bar 30 for bonding extends from the side of the control unit 23 toward the side of the electric motor 2, and overlaps with the terminal 21 for power feeding of the electric motor 2.

A hole 30B larger than a screw diameter of the nut 22 disposed in a rear surface of the terminal 21 for power feeding is disposed in the portion in which the bus bar 30 for bonding overlaps with the terminal 21 for power feeding, and a center position of the hole 30B is arranged so as to become substantially the same as a center position of the hole 21B of the terminal 21 for power feeding. In addition, a bonded surface 30C of the bus bar 30 for bonding faces in a direction substantially parallel to the shaft 10.

Next, a procedure for attaching the control unit 23 to the electric motor 2 will be described.

First, the control unit 23 and the electric motor 2 separately assembled are respectively assembled in an axial direction. In this case, the bus bar 30 for bonding enters the inside of the housing 3 through the hole 3C of the housing 3 and is arranged in a position of overlapping with the terminal 21 for power feeding.

Next, in order to bond the bus bar 30 for bonding to the terminal 21 for power feeding, the screw 31 is bonded from the opening part 3D of the housing 3 using a tool for screw fastening and surface contact between the bus bar 30 for bonding and the terminal 21 for power feeding is made and the bus bar 30 for bonding is connected to the terminal 21 for power feeding.

Finally, the housing opening part 3D is closed using the cover 32 and the cover 32 is fixed by the screw 33.

Further, this electric motor apparatus 1 for electric power steering is attached to an attachment part 40 of the gear box 36 in the axial direction by an attachment screw from the side of the motor apparatus 1.

In addition, the resolver rotor 14A and the boss 13 may be assembled by supporting the shaft 10 from the hole 4B after the control unit 23 is assembled into the electric motor 2.

When the control unit 23 is separated from the electric motor 2, the screw 33 is first detached and the cover 32 is detached from the housing 3.

Next, the screw 31 is detached from the housing opening part 3D using a tool and bonding between the bus bar 30 for bonding and the terminal 21 for power feeding is released. Finally, the control unit 23 is separated from the electric motor 2. After the separation, reassembly can be made as described above.

Also, the electric motor apparatus 1 for electric power steering is detached from the electric power steering apparatus 41 and separation is performed as described above and also reassembly can be made.

In the electric motor apparatus 1 for electric power steering of the configuration described above, a bonding region in which the power feeding part 21A of the electric motor 2 is bonded to the bonding part 30A of the control unit 23 is present inside the housing 3 and the screw 31 which is a member for bonding is used in the bonding region and the opening part 3D for passing a screw tightening tool or the screw 31 is disposed in the housing 3, so that separation between the electric motor 2 and the control unit 23 can be made and workability of separation greatly improves and also reassembly can be made.

Since the electric motor 2 and the control unit 23 are integrally formed and are placed coaxially with the shaft 36a of the gear box 36, it is miniaturized and the number of components can be reduced and also workability of attachment and detachment improves.

Since the control unit 23 is placed between the gear box 36 and the electric motor 2, heat generation of the control unit 23 is efficiently transmitted to the side of the gear box 36 and the whole apparatus can be constructed compactly at low cost.

Moreover, the driving circuit 26 is placed in the side of the gear box 36 and heat is effectively conducted.

Since it is coaxial, an area of a bonded surface of each member related to heat conduction can efficiently be ensured and the heat conduction can be improved and both of miniaturization and heat dissipation properties can be achieved.

Also, bonding between the power feeding part 21A of the electric motor 2 and the bonding part 30A of the control unit 23 is performed by the screw 31, so that electrical separation between the electric motor 2 and the control unit 23 is facilitated and also electrical bonding is facilitated.

Further, a bonding state is managed by the tightening torque by the screw 31, so that durability and reliability of bonding can be ensured.

Also, when an outside diameter of a head part of the screw 31 is increased, a bonding area of a bonding region of the bonded surface 30C of the bus bar 30 for bonding and the bonded surface 21C of the terminal 21 for power feeding increases and contact resistance can be decreased, so that a rise in temperature of the bonding region can be reduced when a driving current is high or an ambient temperature is high.

Also, by disposing a position of the opening part 3D of the housing 3 in a direction substantially vertical to the shaft 10, bonding and separation between the electric motor 2 and the control unit 23 can be made from its direction (one direction) and workability improves.

In some cases, the stator 5 can also be replaced by detaching the screw 31 etc. in a state of the electric power steering apparatus 41 or the electric motor apparatus 1 for electric power steering.

Also, the bonded surface 30C of the bus bar 30 for bonding of the control unit 23 and the terminal 21 for power feeding of the electric motor 2 are set in a direction substantially parallel to the shaft 10, so that the power feeding part 21A or the bonding part 30A can be constructed relatively easily.

Also, in the case of considering automatization of bonding by the screw 31, a tool or equipment for screw fastening is also positioned based on substantially the parallel direction, so that indexing etc. of a position are facilitated.

Also, the bus bar 30 for bonding of the control unit 23 axially extends from the side of the control unit 23 toward the side of the electric motor 2 and overlaps with the terminal 21 for power feeding and the nut 22 is arranged in a rear surface of the terminal 21 for power feeding, so that bonding can be performed by only the screw 31 from the outside and assembly is facilitated and the number of components for bonding is also minimized.

Also, the housing opening part 3D is covered with the cover 32, so that invasion of a foreign substance from the outside can be prevented and reliability of the apparatus can be improved.

Second Embodiment

Figure 5:
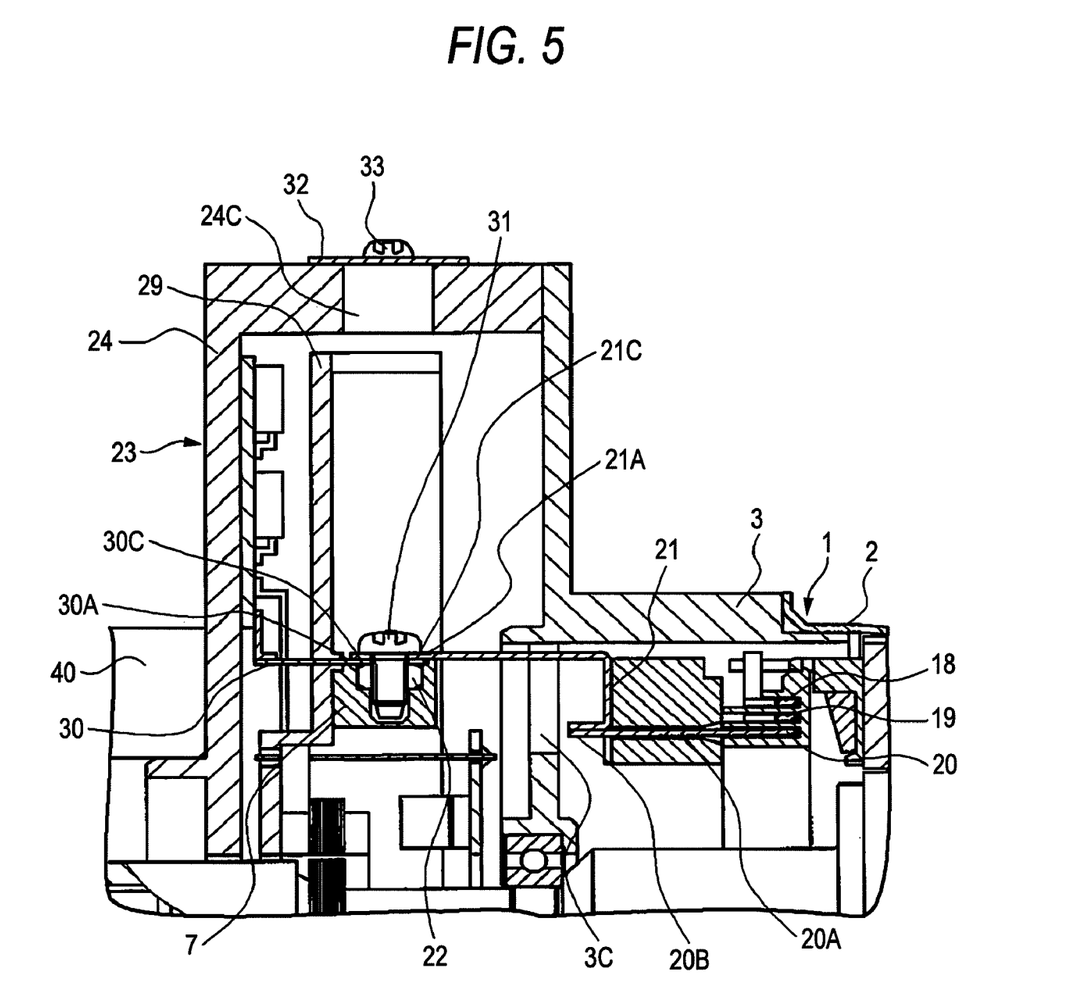
FIG. 5 is an enlarged view of a bonding region of a bonding part and a power feeding part of a second embodiment of the invention.

FIG. 5 is an enlarged view of a bonding region of a bonding part and a power feeding part of a second embodiment. The second embodiment has a structure similar to that of the first embodiment except for the illustration.

In this embodiment, a base 7 is present inside a case 24 of a control unit 23 and the base 7 is held by a lead frame 29. A terminal 21 for power feeding of an electric motor 2, a bus bar 30 for bonding bonded by a screw 31 and a nut 22 into which the screw 31 is screwed are incorporated into the base 7 and are constructed, and a hole 30B larger than a screw diameter is disposed in the bus bar 30 for bonding.

In addition, a bonded surface 30C of the bus bar 30 for bonding faces in a direction substantially parallel to a shaft 10.

On the other hand, in the side of the electric motor 2, the terminal 21 for power feeding welded to a U-phase terminal 18, a V-phase terminal 19 and a W-phase terminal 20 extends from the side of the electric motor 2 toward the side of the control unit 23 through a hole 3C of a housing 3 and overlaps with the bus bar 30 for bonding.

A hole 21B larger than a screw diameter of the nut 22 is disposed in the portion in which the terminal 21 for power feeding overlaps with the bus bar 30 for bonding, and a center position of the hole 21B is arranged so as to become substantially the same as a center position of the hole 30B of the bus bar 30 for bonding.

In addition, a bonded surface 21C of the terminal 21 for power feeding faces in a direction substantially parallel to the shaft 10.

In the case 24, an opening part 24C is bored in a region opposed to the base 7, and this opening part 24C is disposed in a direction substantially vertical to the shaft 10. A screw hole for fixing a cover 32 by a screw is disposed in an outer circumferential surface of the opening part 24C.

In the cover 32, a hole for attachment by a screw 33 is disposed so as to cover the case opening part 24C.

The other configuration is similar to that of the first embodiment.

In this embodiment, a bonding region in which a power feeding part 21A of the electric motor 2 is bonded to a bonding part 30A of the control unit 23 is present inside the case 24 and the opening part 24C for passing the screw 31 which is a member for bonding in the bonding region is disposed in the case 24, so that an effect similar to that of the first embodiment can be obtained.

In this case, a stator 5 can also be replaced by detaching the screw 31 etc. in a state of an electric power steering apparatus 41 or an electric motor apparatus 1 for electric power steering in some cases.

Also, the opening part 24C is disposed in the housing 3 in the first embodiment and is disposed in the case 24 in the second embodiment, but may be disposed astride both members of the housing 3 and the case 24.

Third Embodiment

Figure 6:
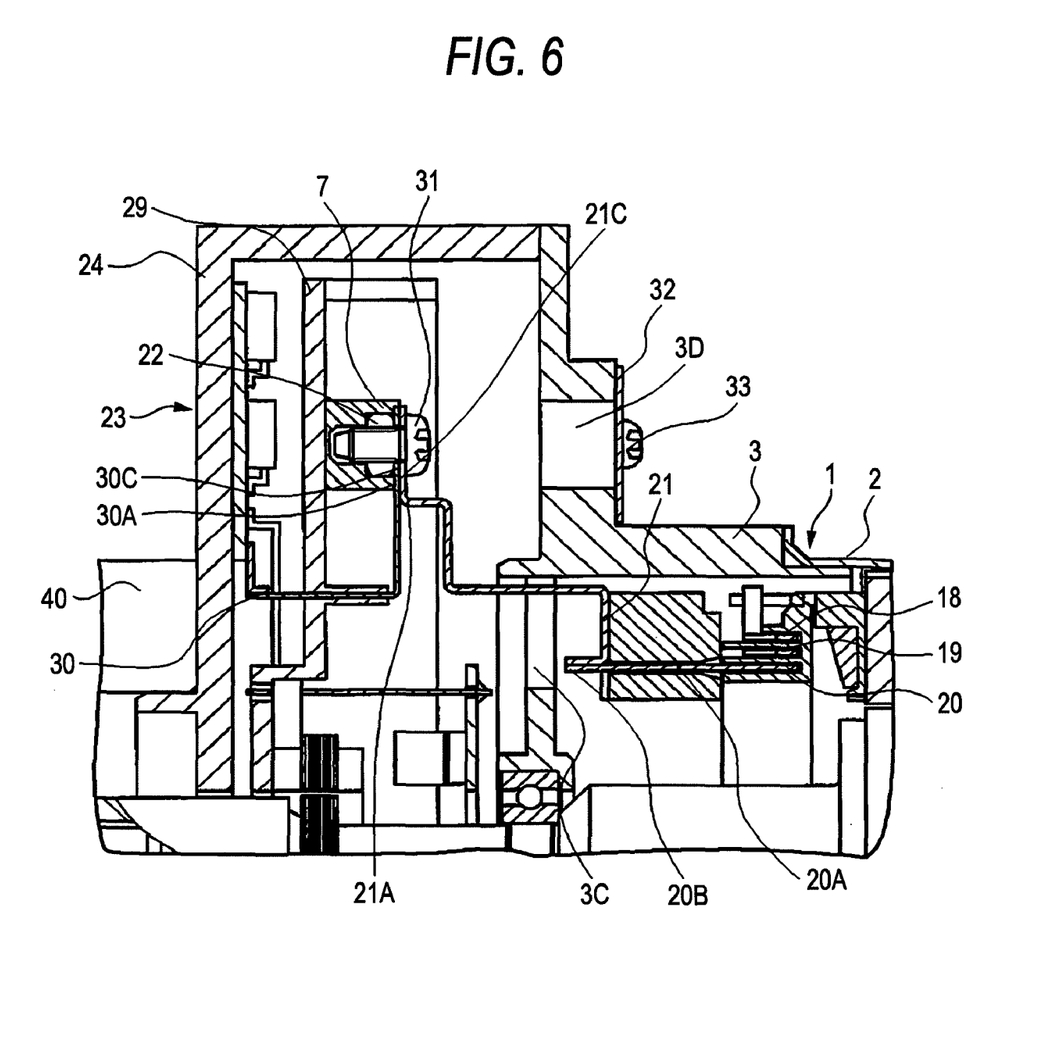
FIG. 6 is an enlarged view of a bonding region of a bonding part and a power feeding part of a third embodiment of the invention.

FIG. 6 is an enlarged view of a bonding region of a bonding part and a power feeding part of a third embodiment. The third embodiment has a structure similar to that of the first embodiment except for the illustration.

In this embodiment, a base 7 is held by a lead frame 29 and is arranged inside a case 24. A bus bar 30 for bonding bonded to a terminal 21 for power feeding of an electric motor 2 by a screw 31 and a nut 22 into which the screw 31 is screwed are incorporated into the base 7 and are constructed.

In addition, it is constructed so that a bonded surface 30C of the bus bar 30 for bonding faces in a direction substantially vertical to a shaft 10 and faces to the side of a housing 3.

On the other hand, in the electric motor 2, the terminal 21 for power feeding welded to a U-phase terminal 18, a V-phase terminal 19 and a W-phase terminal 20 extends from the inside diameter side toward the outside diameter side of the electric motor 2 and overlaps with the bus bar 30 for bonding.

In this case, welding is performed after a frame 4 into which a stator 5 is incorporated is mounted in the housing 3 into which a rotor 12 is incorporated.

In addition, it is constructed so that a bonded surface 21C of the terminal 21 for power feeding also faces in a direction substantially vertical to the shaft 10 and faces to the side of the housing 3.

In the housing 3, an opening part 3D is bored in a region opposed to the base 7 in an axial direction, and this opening part 3D is disposed in a direction substantially parallel to the shaft 10.

A screw hole for fixing a cover 32 by a screw is disposed in an outer circumferential surface of the opening part 3D.

The cover 32 is arranged so as to cover the opening part 3D and is fixed to the housing 3 by a screw 33.

The other configuration is similar to that of the first embodiment.

In this embodiment, a bonding region in which a power feeding part 21A of the electric motor 2 is bonded to a bonding part 30A of the control unit 23 is present inside the housing 3 and the opening part 3D for arranging the screw 31 which is a member for bonding in the bonding region is disposed in the housing 3. In this embodiment, a direction of fastening of the screw 31, a direction of assembly of the cover 32, a direction of assembly of the control unit or the electric motor 2 and a direction of attachment to a gear box 36 are set in the same direction and there is an effect of particularly improving workability of assembly.

The other effect is similar to that of the first embodiment and in the case of this embodiment, the welded terminal 21 for power feeding extends from the inside diameter side toward the outside diameter side of the electric motor 2 and there is an effect capable of constructing a position of the terminal 21 for power feeding in any position in consideration of layout properties etc., but in the case of arranging the terminal 21 for power feeding in the outside diameter side of the electric motor 2, only the stator 5 cannot be replaced as described in the first and second embodiments.

Fourth Embodiment

Figure 7:
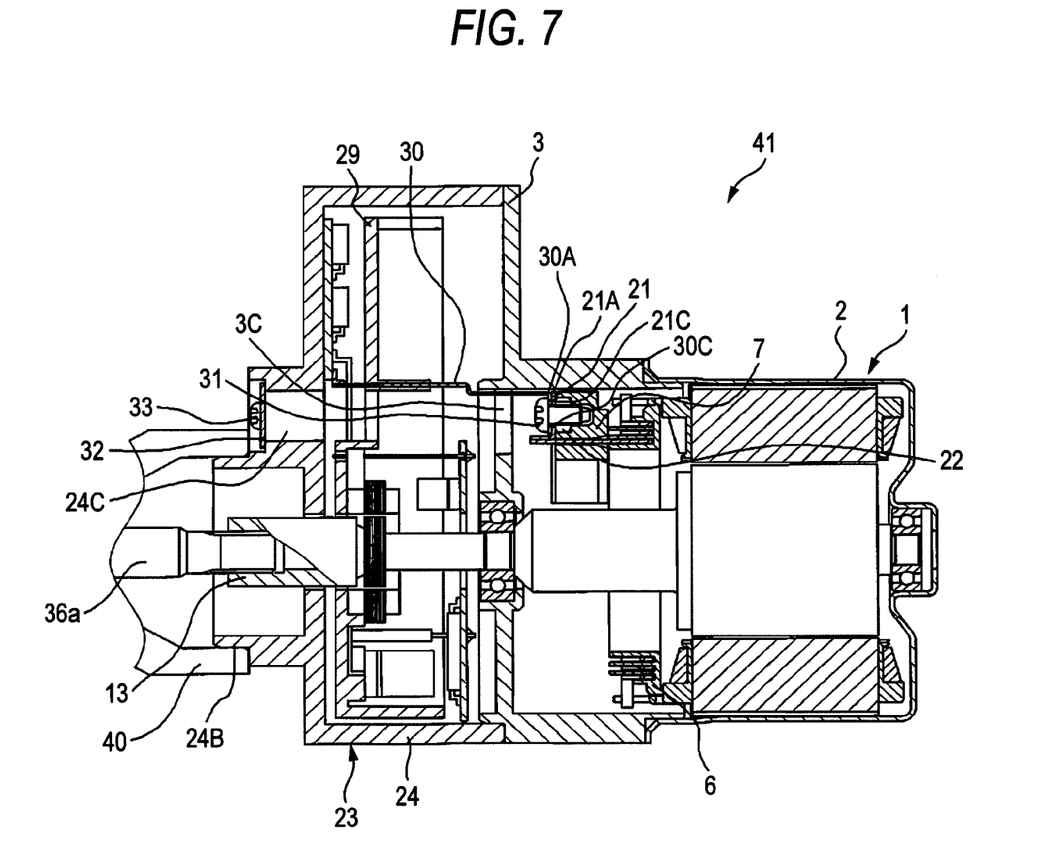
FIG. 7 is a sectional view of an electric motor apparatus for electric power steering of a fourth embodiment of the invention.
Figure 8:
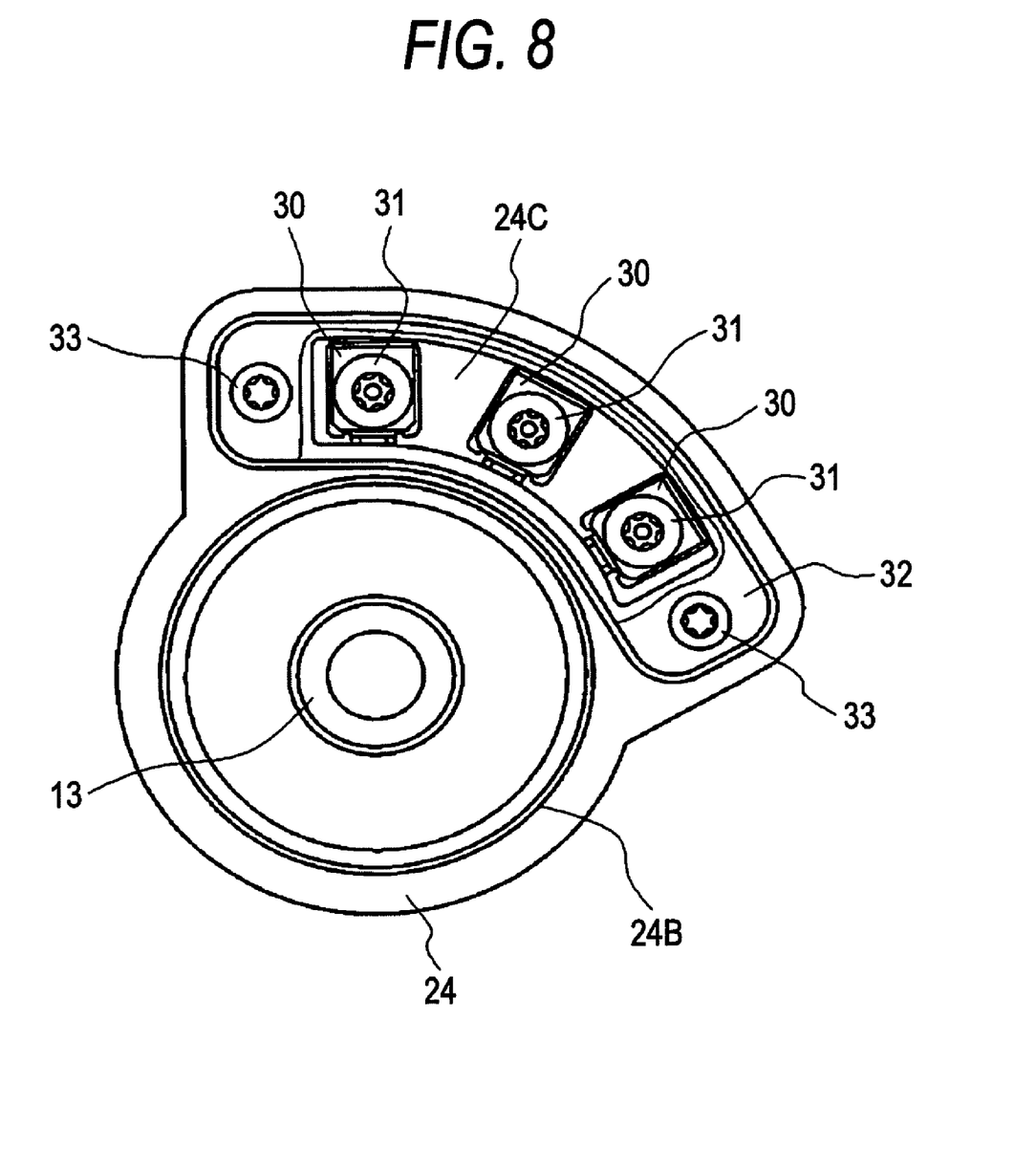
FIG. 8 is an explanatory diagram of a side surface of FIG. 7 when a bonding region of FIG. 7 is viewed from the side of a gear box 36.

FIG. 7 is a sectional view of an electric motor apparatus for electric power steering of a fourth embodiment, and FIG. 8 is an explanatory diagram of a side surface of FIG. 7 when a bonding region of FIG. 7 is viewed from the side of a gear box 36.

In this embodiment, a base 7 is present inside a housing 3 of an electric motor 2 and the base 7 is held by a holder 6. A bus bar 30 for bonding of a control unit 23, a terminal 21 for power feeding bonded by a screw 31 and a nut 22 into which the screw 31 is screwed are incorporated into the base 7 and are constructed.

In addition, it is constructed so that a bonded surface 21C of the terminal 21 for power feeding faces in a direction substantially vertical to an electric motor shaft and faces to the side of a case 24.

On the other hand, in the side of the control unit 23, the bus bar 30 for bonding extends from the side of the control unit 23 toward the side of the electric motor 2 and overlaps with the terminal 21 for power feeding of the electric motor 2. In addition, it is constructed so that a bonded surface 30C of the bus bar 30 for bonding faces in a direction substantially vertical to a shaft 10 and faces to the side of the case 24.

In the case 24, an opening part 24C is bored in a region opposed to the base 7, and this opening part 24C is disposed in a direction substantially parallel to the shaft 10.

A screw hole for fixing a cover 32 by a screw is disposed in an outer circumferential surface of the opening part 24C. In the cover 32, a hole for attachment by a screw 33 is disposed so as to cover the case opening part 24C.

The other configuration is the same as that of the first embodiment.

In this embodiment, a bonding region in which a power feeding part 21A of the electric motor 2 is bonded to a bonding part 30A of the control unit 23 is present inside the housing 3 and the opening part 24C for passing the screw 31 which is a member for bonding in the bonding region is disposed in the case 24, and the opening part 24C and the bonded surface 21C of the power feeding part 21A and the bonded surface 30C of the bonding part 30A are set in the direction substantially vertical to the electric motor shaft. As a result of this, a direction of assembly of the control unit into the electric motor 2, a direction of fastening of the screw 31, and a direction of assembly of the cover 32 are set in the same direction and there is an effect of improving workability of assembly.

The other effect is the same as that of the first embodiment.

In addition, in this embodiment, the opening part 24C may be closed by being covered with an attachment surface of an attachment part 40 or the gear box 36 opposed to this opening part 24C in an axial direction and in this case, the cover 32 or the screw 33 can be reduced.

In the case of an electric power steering apparatus 41 and an electric motor apparatus 1 for electric power steering attached to a column of the inside of a vehicle, an environmental condition such as waterproof properties is eased, so that such a configuration is enabled and the number of components is reduced and the number of man-hours of assembly can also be reduced and the whole apparatus can be constructed at low cost. Moreover, an area of contact between the case 24 and the attachment part 40, etc. increases and heat dissipation properties also improve.

Fifth Embodiment

Figure 9:
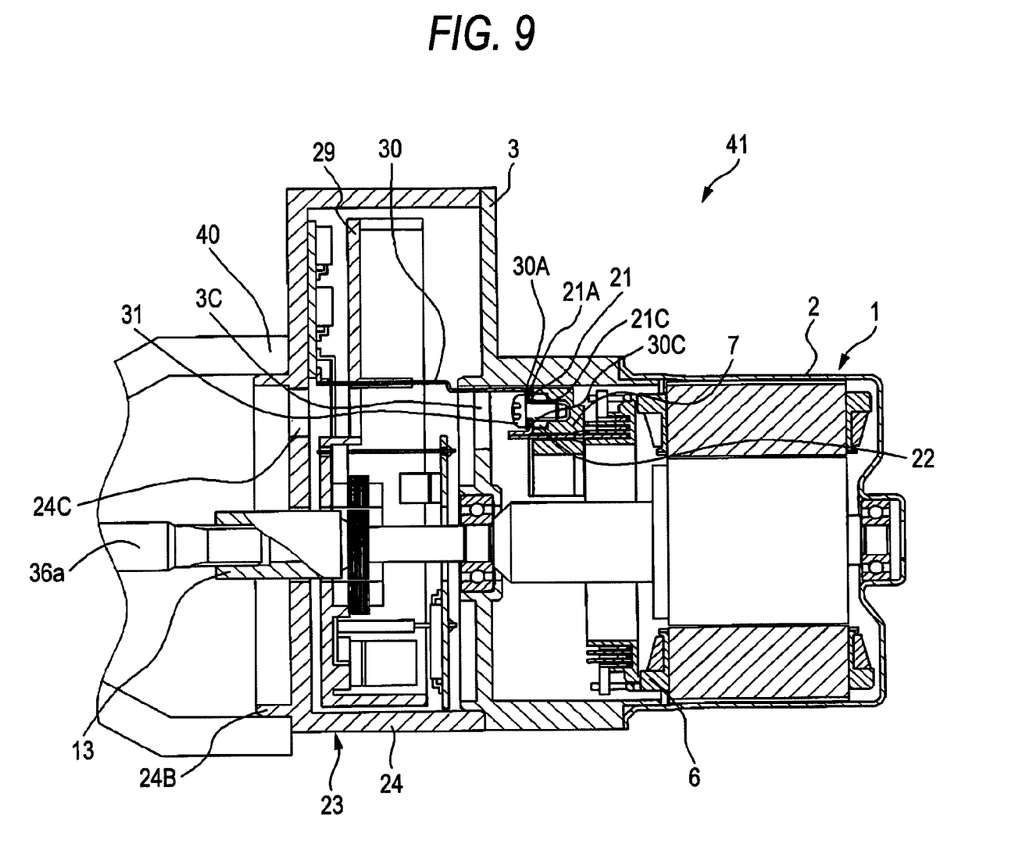
FIG. 9 is a sectional view of an electric motor apparatus for electric power steering of a fifth embodiment of the invention.
Figure 10:
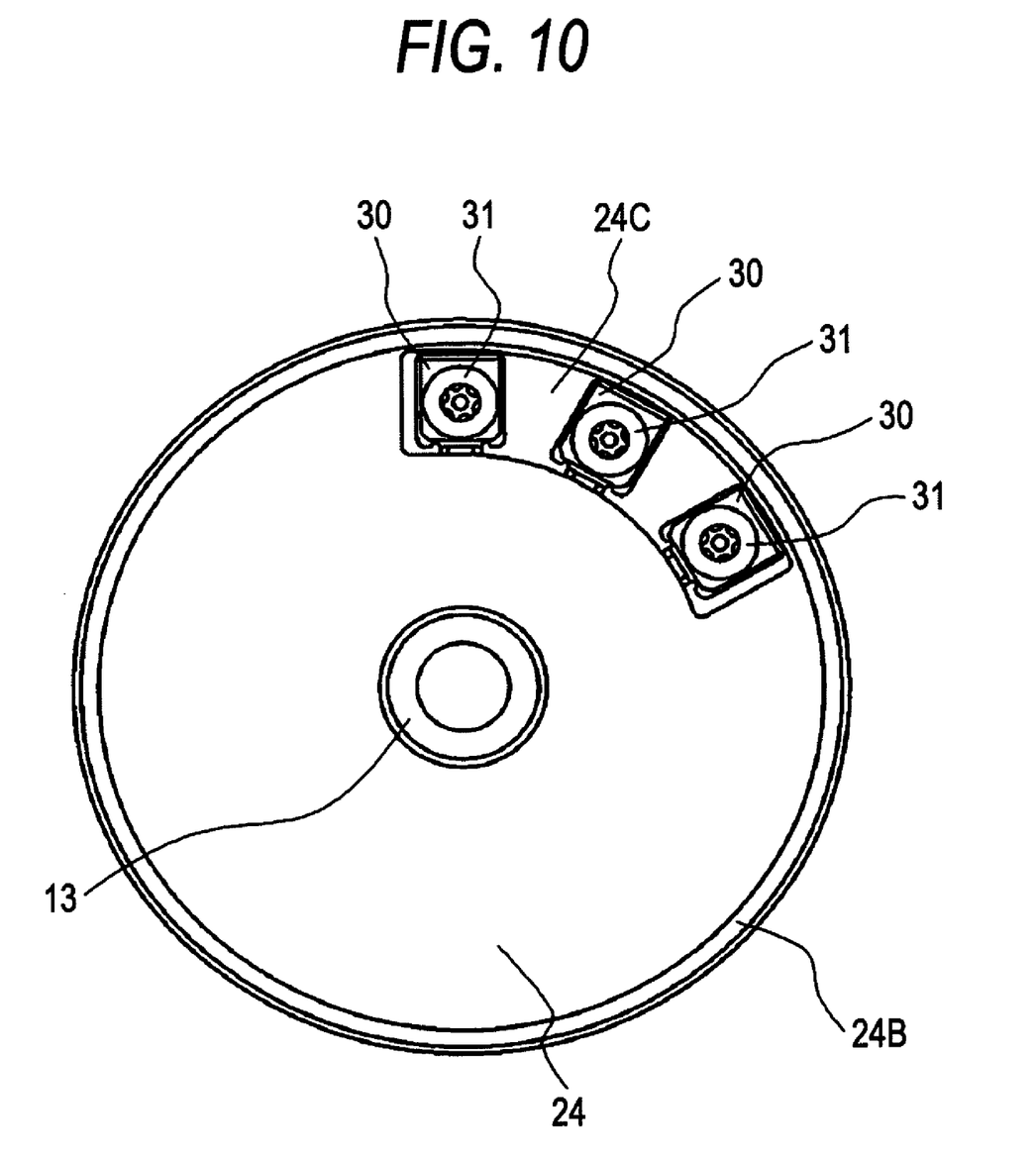
FIG. 10 is an explanatory diagram of a side surface of FIG. 9 when a bonding region of FIG. 9 is viewed from the side of a gear box 36.

FIG. 9 is a sectional view of an electric motor apparatus for electric power steering of a fifth embodiment, and FIG. 10 is an explanatory diagram of a side surface of FIG. 9 when a bonding region of FIG. 9 is viewed from the side of a gear box 36.

In this embodiment, a case opening part 24C is present in the inside diameter side beyond a gear box side fitting part 24B for fitting into the gear box 36.

The other configuration is the same as that of the fourth embodiment.

In this embodiment, the opening part 24C is present in the inside diameter side beyond the gear box side fitting part 24B with respect to the fourth embodiment, so that by assembling an electric motor apparatus 1 for electric power steering into the gear box 36 of a speed reduction mechanism, the opening part 24C is closed by the inside of an attachment part 40, so that the need for a cover is eliminated and cost and the number of components can be reduced.

The other effect is the same as that of the first embodiment.

In addition, in each of the embodiments, the so-called column type electric power steering apparatus 41 in which the electric motor apparatus 1 for electric power steering is mounted in the gear box 36 of a column of the inside of a vehicle has been described, but needless to say, it can also be properly applied to the so-called rack assist type or pinion assist type electric power steering apparatus 41.

In this case, by sealing each of the bonded surfaces of the gear box 36 and the control unit 23, the control unit 23 and the electric motor 2, the housing 3 and the frame 4, and the cover 32 and the housing 3 or the case 24 with an O ring etc., use can properly be made as waterproof specifications.

Also, the case 24 of the control unit 23 has been formed as a component different from the gear box 36 of the speed reduction mechanism, but it can also be properly applied to the case of accommodating the driving circuit 26, the control circuit 28 and the lead frame 29 inside the gear box 36.

In this case, an effect similar to that of the applied embodiments described above can be obtained and further, both the circuits, the lead frame 29, etc. are directly accommodated inside the gear box 36, so that the need for the case 24 is eliminated and cost or the number of components can be reduced and also the compact electric power steering apparatus 41 with good heat conductivity can be obtained. Particularly, heat dissipation properties can be improved by placing the driving circuit 26 in the side of the gear box 36.

Also, the electric motor 2 has been described using a brushless motor, but needless to say, a brush motor or an induction motor, etc. may be used.

What is claimed is:

1. An electric motor apparatus for electric power steering, the electric motor apparatus comprising:
- an electric motor comprising:
  - a rotor in which a shaft is rotatably supported;
  - a stator that is disposed outside the rotor;
  - a power feeding part that is connected to the stator or the rotor and supplies electric power; and
  - a housing for supporting the rotor and the stator; and
- a control unit comprising:
  - a driving circuit for supplying electric power to the electric motor;
  - a bonding part bonded to the power feeding part of the electric motor;
  - a control circuit for controlling the driving circuit; and
  - a case for covering the driving circuit and the control circuit,
- wherein the electric motor is formed integrally with the control unit,
- the control unit and the electric motor are attached to a gear box for reducing a speed of rotation of the electric motor and are disposed coaxially with a shaft of the gear box,
- the control unit is disposed between the gear box and the electric motor,
- the power feeding part of the electric motor is bonded to the bonding part of the control unit inside the housing or the case through an opening part disposed in the housing and/or the case,
- the power feeding part is bonded to the bonding part using a screw,
- the electric motor and the control unit are integrally assembled by passing the shaft through the control unit after the electric motor and the control unit are separately assembled, and
- the electric motor is configured to be separated from, the control unit, in a state in which the electric motor apparatus for electric power steering is attached to the gear box, after the screw is removed through the opening and a close contact between the power feeding part of the electric motor and the bonding part of the control unit is released.

2. The electric motor apparatus for electric power steering according to claim 1,
wherein the opening part is disposed in a direction substantially vertical to the shaft of the electric motor.

3. The electric motor apparatus for electric power steering according to claim 1,
wherein the opening part of the housing is disposed in a direction substantially parallel to the shaft of the electric motor.

4. The electric motor apparatus for electric power steering according to claim 1,
wherein the opening part of the case is disposed in a direction substantially parallel to the shaft of the electric motor.

5. The electric motor apparatus for electric power steering according to claim 2,
wherein bonded surfaces of a bus bar for bonding of the bonding part and a terminal for power feeding of the power feeding part are set in a direction substantially parallel to the shaft of the electric motor.

6. The electric motor apparatus for electric power steering according to claim 5,
wherein the terminal for power feeding of the power feeding part axially extends from a side of the electric motor toward a side of the control unit and overlaps with the bus bar for bonding of the bonding part, and
an internal thread part is constructed in a rear surface of the bus bar for bonding.

7. The electric motor apparatus for electric power steering according to claim 3,
wherein bonded surfaces of the bus bar for bonding of the bonding part and a terminal for power feeding of the power feeding part are set in a direction substantially vertical to the shaft of the electric motor.

8. The electric motor apparatus for electric power steering according to claim 7,
wherein the terminal for power feeding of the power feeding part extends from an inside diameter side toward an outside diameter side of the electric motor and overlaps with the bus bar for bonding of the bonding part, and
an internal thread part is constructed in a rear surface of the bus bar for bonding.

9. The electric motor apparatus for electric power steering according to claim 5,
wherein the bus bar for bonding of the bonding part axially extends from a side of the control unit toward a side of the electric motor and overlaps with the terminal for power feeding of the power feeding part, and
an internal thread part is constructed in a rear surface of the terminal for power feeding.

10. The electric motor apparatus for electric power steering according to claim 2,
wherein the opening part is covered with a cover.

11. The electric motor apparatus for electric power steering according to claim 4,
wherein the opening part of the case is disposed in a side of the gear box and the opening part is covered with the gear box opposed to the opening part or an attachment part of the gear box.

12. The electric motor apparatus for electric power steering according to claim 4,
wherein the opening part of the case is disposed in a side of the gear box and is covered with the gear box in an inside diameter side beyond a gear box side fitting part.

13. The electric motor apparatus for electric power steering according to claim 4,
wherein bonded surfaces of the bus bar for bonding of the bonding part and a terminal for power feeding of the power feeding part are set in a direction substantially vertical to the shaft of the electric motor.

14. The electric motor apparatus for electric power steering according to claim 7,
wherein the bus bar for bonding of the bonding part axially extends from a side of the control unit toward a side of the electric motor and overlaps with the terminal for power feeding of the power feeding part, and
an internal thread part is constructed in a rear surface of the terminal for power feeding.

15. The electric motor apparatus for electric power steering according to claim 3,
wherein the opening part is covered with a cover.

16. The electric motor apparatus for electric power steering according to claim 4,
wherein the opening part is covered with a cover.

17. An electric power steering apparatus comprising the electric motor apparatus for electric power steering according to claim 1,
wherein the electric motor is mounted in an attachment part of the gear box for reducing a speed of rotation of the motor apparatus, and
the motor apparatus is placed substantially coaxially with the shaft of the gear box.

* * * * *